Figure 1:
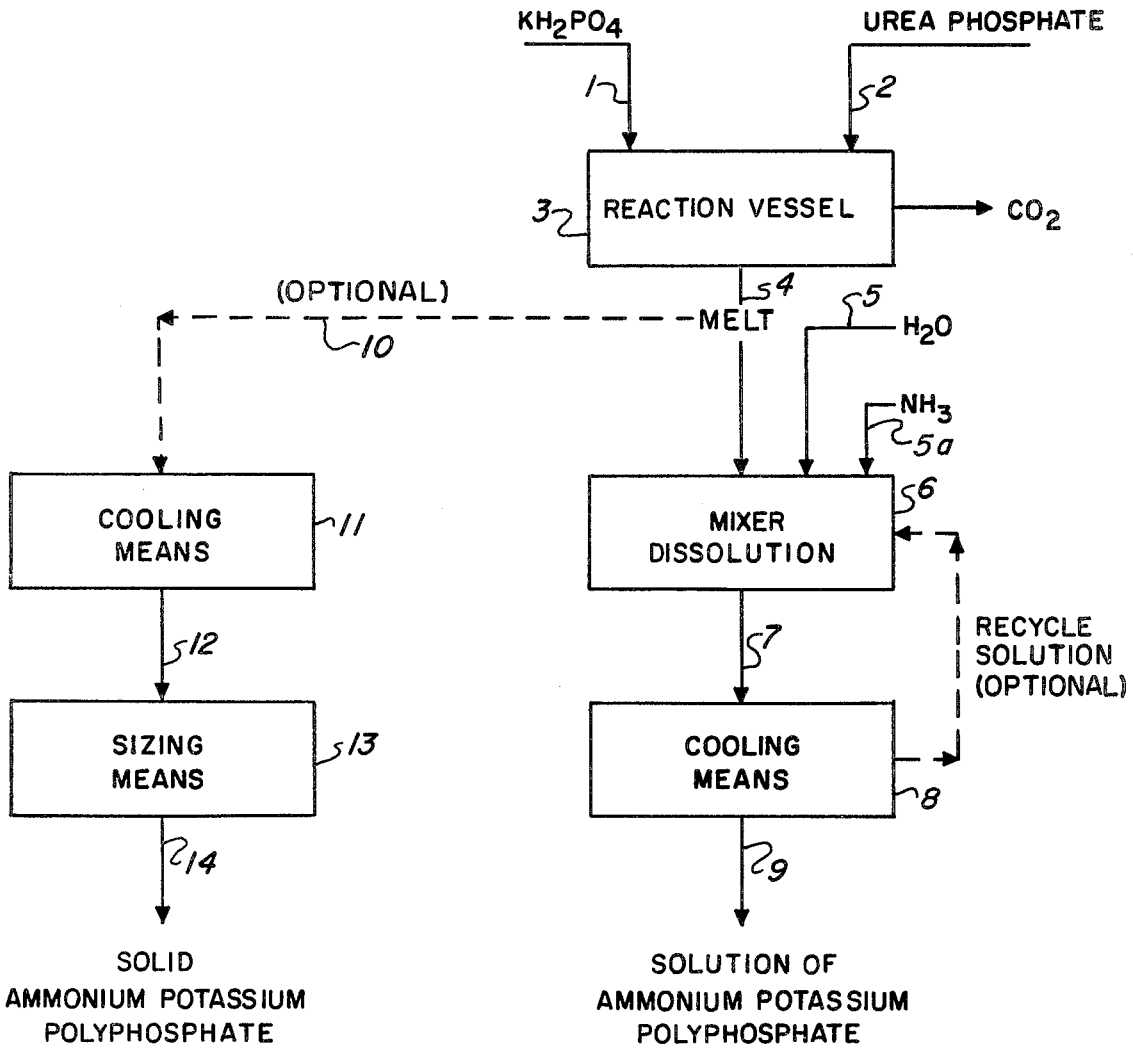
Figure 2:
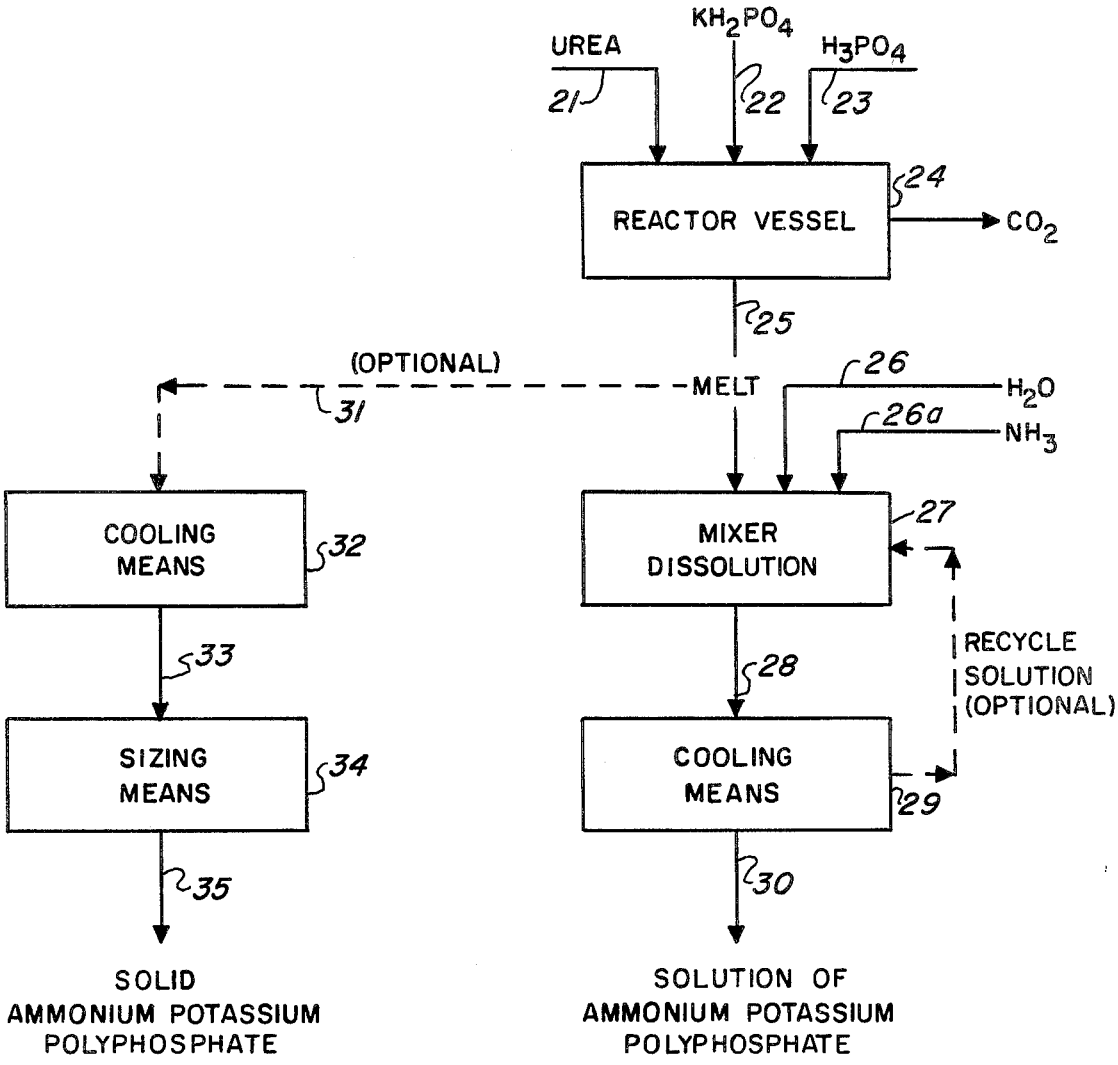

United States Defensive Publication [19] (H) [11] T996,001

Sheridan et al. [43] Jul. 1, 1980

[54] PRODUCTION OF AMMONIUM POTASSIUM POLYPHOSPHATES

[75] Inventors: Richard C. Sheridan, Sheffield; John F. McCullough, Florence; Leland L. Frederick, Florence, all of Ala.

[73] Assignee: Tennessee Valley Authority, Washington, D.C.

[21] Appl. No.: 76,007

[22] Filed: Sep. 17, 1979

[51] Int. Cl.[3] ..... C05B 7/00

[52] U.S. Cl. ..... 71/36; 71/51; 71/64 C; 423/306

[57] ABSTRACT

Embodiment No. 1. Urea phosphate prepared from wet-process phosphoric acid is heated with monopotassium orthophosphate in a mole ratio of 0.25 to 4.0 at 130° to 200° C. to form an ammonium potassium polyphosphate having an average chain length between 1.2 and 2.5. The ammonium potassium polyphosphate is dissolved in aqueous ammonia to yield concentrated fertilizer solutions containing the three major nutrients and over 50 percent total plant food.

Embodiment No. 2. Phosphoric acid containing 54 to 76 percent $P_2O_5$ is heated with urea (urea:$H_3PO_4$ mole ratio 0.5 to 2.0) and monopotassium orthophosphate (urea:$KH_2PO_4$ mole ratio 0.25 to 4.0) at 130° to 200° C. to form an ammonium potassium polyphosphate having an average chain length between 1.2 and 2.5. The ammonium potassium polyphosphate is dissolved in aqueous ammonia to yield concentrated fertilizer solutions containing the three major nutrients and over 50 percent total plant food.

5 Claims, 2 Sheets Drawing,

17 Pages Specification

The file of this unexamined application may be inspected and copies thereof may be purchased (849 O.G. 1221, Apr. 9, 1968).

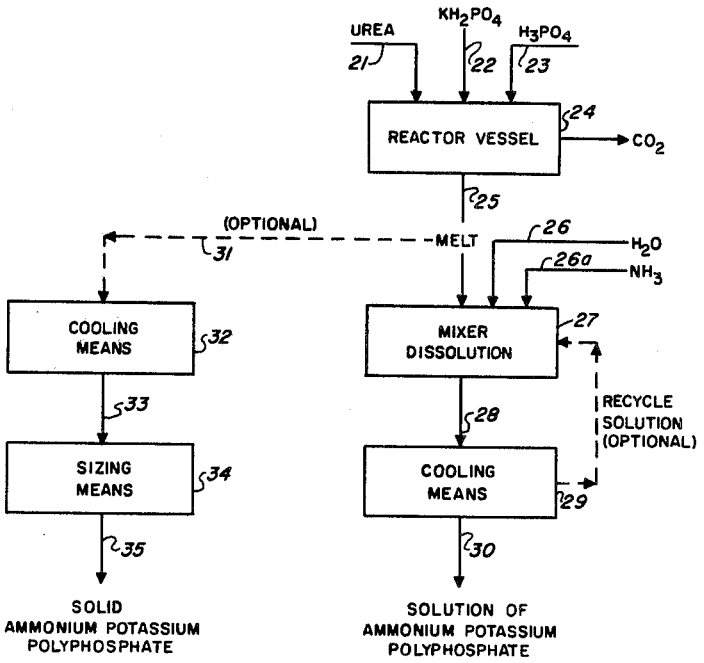

PREPARATION OF AMMONIUM POTASSIUM POLYPHOSPHATE

PREPARATION OF AMMONIUM POTASSIUM POLYPHOSPHATE

PREPARATION OF AMMONIUM POTASSIUM POLYPHOSPHATE